United States Patent [19]
Bourdin et al.

[11] 3,872,156
[45] Mar. 18, 1975

[54] PROCESS FOR THE PREPARATION OF PHENOLS BY OXIDATION OF AROMATIC ALDEHYDES

[75] Inventors: Francois Bourdin, Lyon; Francois Chizat, Bron; Michel Costantini, Lyon; Michel Jouffret, Francheville le Bas, all of France

[73] Assignee: Rhone-Poulenc S.A., Paris, France

[22] Filed: Nov. 17, 1972

[21] Appl. No.: 307,530

[30] Foreign Application Priority Data
Nov. 19, 1971 France .............................. 71.41411

[52] U.S. Cl...... 260/479 R, 260/621 R, 260/621 G, 260/624 R, 260/626 R, 260/626 T
[51] Int. Cl............................................. C07c 37/00
[58] Field of Search........ 260/479 R, 621 R, 621 G, 260/624 R, 626 R, 626 T

[56] References Cited
UNITED STATES PATENTS
3,585,243  6/1971  Gradeff...................... 260/621 G X OTHER PUBLICATIONS
Ogata, "J. Ong. Chem.," Vol. 26, pp. 4803–7, (1961) (Cited by applicant)

Kirk–Othmer, Encyclo. of Chem. Tech., 2nd edition, Vol. 19, "Sulfolane", (1969).

*Primary Examiner*—Bernard Helfin
*Assistant Examiner*—Norman Morgenstern
*Attorney, Agent, or Firm*—Cushman, Darby & Cushman

[57] ABSTRACT

A phenol of formula:

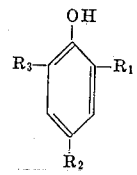

where $R_1$, $R_2$ and $R_3$ independently represent hydrogen or $C_1$–$C_5$ alkyl is obtained by oxidising with hydrogen peroxide a solution of the corresponding aldehyde in a polymethylene sulphone e.g. sulpholane.

8 Claims, No Drawings

PROCESS FOR THE PREPARATION OF PHENOLS BY OXIDATION OF AROMATIC ALDEHYDES

The present invention relates to a process for the preparation of phenols, and more particularly to a process for the preparation of phenol and its alkyl-substituted derivatives, by oxidising aromatic aldehydes with hydrogen peroxide.

It is known that phenols can be obtained by oxidising aromatic aldehydes according to the BAYER and WILLIGER reaction either by using organic peracids (peracetic acid or perbenzoic acid) or by using hydrogen peroxide as the oxidising agents. When a peracid is used, the BAYER and WILLIGER reaction leads, as a general rule, almost quantitatively to a phenol if the starting aldehyde contains an electron donor substituent (for example, hydroxyl or alkoxy groups), cf. J. BOESEKEN et al., Rec. Trav. Chim. Pays Bas, 55, 815 (1936); ibid., 58, 528 (1939); A. WACEK et al., Ber., 73, 644 (1940); ibid., 74, 845 (1941); Y. OGATA et al., J. Org. Chem., 26, 4803 (1961); and ibid., 34, 3985 (1969). On the other hand, if the starting aldehyde contains an electron acceptor substituent (for example, an $NO_2$, methylcarbonyloxy or halogeno group) or if it is unsubstituted (benzaldehyde), the reaction leads to the exclusive or preferential formation of the corresponding benzoic acids: cf. A. WACEK et al., loc. cit.; and Y. OGATA, loc. cit. Benzaldehyde has been oxidised quantitatively to benzoic acid by peracetic acid (J. D'ANS et al., Ber., 48, 1136[1915]) and by perbenzoic acid (Y. OGATA et al., loc. cit.). Although the rule given above is confirmed in the majority of cases, some exceptions have been reported: J. D'ANS et al., loc. cit., report that 4-methoxy-benzaldehyde is oxidised quantitatively to 4-methoxy-benzoic acid, by peracetic acid in aqueous alcohol. Furthermore although the methyl group and other alkyl groups are considered to be electron donor groups, p-tolualdehyde gives p-toluic acid in 76% yeild when oxidised by perbenzoic acid (cf. Y. OGATA, J. Org. Chem., 26, 4805 [1961]).

When hydrogen peroxide is used as the oxidising agent, and the reaction is carried out in neutral water or in an organic solvent medium (acetone, ether or pyridine), the acid corresponding to the starting aldehyde is obtained as the principal or exclusive reaction product, and, in certain cases, a phenol is obtained in low yield. Thus A. WACEK et al., Ber., 73, 644 (1940) have oxidised o- and p-hydroxy-benzaldehydes essentially to acids, with hydrogen peroxide in a neutral aqueous medium, in acetone and in pyridine; according to E. SPATH et al., Ber. 73, 935 (1940), the oxidation of various methoxy-benzaldehydes and of benzaldehyde itself using hydrogen peroxide in ether leads to low yields of phenols (0.7% in the case of benzaldehyde). When hydrogen peroxide is used in an alkaline medium (DAKIN reaction), a phenol is generally obtained when a substituted benzaldehyde containing at least one hydroxyl group is used as the starting material, and an acid is generally obtained when an aldehyde which does not contain such a substituent is used as the starting material.

We have now found a process by which benzaldehyde and its alkyl-substituted derivatives can be oxidised to the corresponding phenols, with good yields, with hydrogen peroxide.

The present invention provides a process for the preparation of a phenol of the general formula:

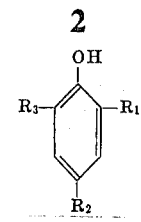

(I)

in which $R_1$, $R_2$ and $R_3$, which may be identical or different, each represent a hydrogen atom or a linear or branched alkyl radical containing 1 to 5 carbon atoms, which comprises oxidising an aldehyde of the general formula:

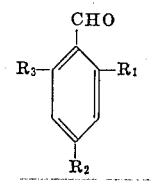

(II)

in which $R_1$, $R_2$ and $R_3$ are as defined above, with hydrogen peroxide, the aldehyde being in solution in a polymethylene-sulphone.

The polymethylene-sulphone used may be one with 3 to 6 methylene groups, and one or more of these methylene groups can optionally be substituted by one or more alkyl groups of 1 to 4 carbon atoms, it being possible for the total number of these alkyl groups to be 1–6.

Specific examples of sulphones which may be used include trimethylene-sulphone; α-methyl-trimethylene-sulphone; pentamethylene-sulphone; α-methyl-pentamethylene-sulphone; and hexamethylene-sulphone. A preferred class of polymethylene-sulphones are sulpholane (tetramethylene-sulphone) and its alkyl-substituted derivatives such as those described in French Patent Specification No. 1,342,449, e.g. 2,3-dimethyl-sulpholane, 2,4-dimethyl-sulpholane, 3-ethyl-sulpholane, 2-methyl-sulpholane and 2-methyl-5-propyl-sulpholane.

Aldehydes of the formula (II) which can be employed in the process of the invention are, for example, benzaldehyde; o-tolualdehyde; p-tolualdehyde; 4-isopropyl-benzaldehyde; 4-t-butyl-benzaldehyde; 2,4-dimethyl-benzaldehyde; 2-methyl-4-isopropyl-benzaldehyde; 2-methyl-4-t-butyl-benzaldehyde; 2,4,6-trimethyl-benzaldehyde; and 2,4-dimethyl-6-t-butyl-benzaldehyde.

The reaction can optionally be carried out in the presence of a storng inorganic or sulphonic acid, as catalyst. By strong acid, we mean an acid with a dissociation constant in water greater than $10^{-3}$. It is thus possible to use oxygen-containing inorganic acids such as sulphuric, nitric, perchloric and chlorosulphonic acids; hydrohalic acids such as hydrochloric and hydrobromic acids; sulphonic acids such as methane-sulphonic, ethane-sulphonic, ethane-disulphonic, methoxy-sulphonic, benzene-sulphonic, benzene-disulphonic, toluene-sulphonic, naphthalene-sulphonic and -disulphonic acids; and sulphonated polymers such as those derived from styrene (for example, sulphonated styrene/divinylbenzene copolymers).

When the reaction is carried out in the presence of an acid, the amount of acid, expressed in equivalents of protons relative to the number of molecules of hydrogen peroxide used, can vary within wide limits. Thus it is possible to carry out the reaction with $H^+/H_2O_2$ ratios of between $1 \times 10^{+4}:1$ and $0.5:1$. In general terms, it is not necessary to use $H^+/H_2O_2$ ratios which are greater than $1 \times 10^{+1}:1$.

The amount of hydrogen peroxide to be used is generally one mole per mole of aromatic aldehyde. It is possible, without disadvantage, to carry out the reaction with less hydrogen peroxide than the stoichiometric requirement of the reaction (for example, by using 0.2 mole of $H_2O_2$ per mol of aldehyde) or with an excess which can be 50% relative to the stoichiometric amount. The hydrogen peroxide is used in the form of aqueous solutions, the concentration of which is not critical.

The concentration of the cyclic sulphone in the reagents is in no way critical and can vary within wide limits. For obvious reasons of convenience, it is preferable to use amounts of sulphone solvent which is sufficient to dissolve the aldehyde being oxidised and which enable the reaction to be carried out in as small a volume of reaction solution as possible.

The sulphone solvent is chosen as a function of the various reaction conditions and of the nature of the aldehyde so as to have complete solution of the aldehyde at the reaction temperature and to carry out the reaction in a medium which is liquid at this temperature. Sulpholane is particularly suitable for carrying out the invention.

The temperature at which the reaction is carried out can vary within wide limits. The reaction is generally carried out at temperatures ranging from 0° to 150°C, and preferably from 20° to 120°C.

The phenol formed during the reaction is in the form of its formate, although, depending on the reaction conditions, a part of the latter can be hydrolysed to the free phenol by the water present in the reaction medium. The phenol formed can be freed from its formate by trans-esterification using a volatile alcohol (methanol or ethanol) or by hydrolysis. The reagents and the conditions for carrying out the process are suitable for continuous operation.

The following Examples illustrate the invention.

EXAMPLE 1

4.1 G of 97% pure p-tolualdehyde and 34.3 g of sulpholane are introduced into a 100 cm³ 3-necked flask, equipped with a stirrer, a reflux condenser, a thermometer and a dropping funnel. The contents of the flask are heated to 105°C and then 1.76 g of hydrogen peroxide solution containing 71% by weight of $H_2O_2$ are run in. The reaction mixture is kept under these conditions for 17 minutes, and, at the end of this time, there is no more active oxygen in the mixture.

1.38 G of unconverted p-tolualdehyde (degree of conversion 65%) and 1.55 g of p-cresol, that is to say a yield of 66% relative to the aldehyde converted, are determined by gas-liquid chromatography in the contents of the flask. 0.75 g of p-toluic acid is also formed.

EXAMPLE 2

The procedure of Example 1 is followed, but at 70°C and in the presence of sulphuric acid. The amounts of reagents used were as follows:

| | | |
|---|---|---|
| sulpholane | 34 | g |
| 97% pure p-tolualdehyde | 4.1 | g |
| 96% strength $H_2O_2$ | 1.22 | g |
| 95% strength $H_2SO_4$ | 0.068 | g |

After 26 minutes, there is no more active oxygen in the reaction mixture, in which the following are determined:

unconverted p-tolualdehyde 0.45 g (degree of conversion 88%)

p-cresol 2.44 g (70.5% yield relative to aldehyde converted).

EXAMPLE 3

The procedure of Example 2 is followed, replacing the sulphuric acid with perchloric acid. The following amounts of reagents were introduced:

| | | |
|---|---|---|
| sulpholane | 32.7 | g |
| p-tolualdehyde | 4.1 | g |
| 67% strength $HClO_4$ | 0.016 | g |
| 98% strength $H_2O_2$ | 0.588 | (dissolved in 3 g of sulpholane). |

After 10 minutes at 70°C, all the active oxygen has disappeared. In the reaction mixture the following are determined:

unconverted p-tolualdehyde 2.3 (degree of conversion 44%)

p-cresol 1.35 g (83% yield relative to aldehyde converted).

EXAMPLE 4

The procedure of Example 3 is followed, replacing the p-tolualdehyde with o-tolualdehyde. The following amounts of reagents were introduced:

| | | |
|---|---|---|
| sulpholane | 49 | g |
| o-tolualdehyde | 6 | g |
| 67% strength $HClO_4$ | 0.024 | g |
| 96% strength $H_2O_2$ | 0.9 | g |

After 1 hour at 70°C, all the active oxygen has disappeared. The following are determined in the reaction mixture:

unconverted o-tolualdehyde 2.8 g (degree of conversion 53%)

o-cresol 2.1 g (73% yield relative to aldehyde converted).

EXAMPLE 5

The prodecure of the preceding Examples is followed, replacing the tolualdehyde with benzaldehyde. The following amounts of reagents were introduced:

| | | |
|---|---|---|
| sulpholane | 59.3 | g |
| benzaldehyde | 7.1 | g |
| 67% strength $HClO_4$ | 0.032 | g |
| 96% strength $H_2O_2$ | 1.2 | g |

After 30 minutes at 70°C, there is no more active oxygen in the reaction mixture, in which the following are determined:

benzaldehyde 3.95 by (degree of conversion 44.5%)

phenol 1.66 g (59.5% yield relative to the benzaldehyde converted).

We claim:

1. A process for the preparation of an oxidation product containing a major amount of a phenol of the general formula:

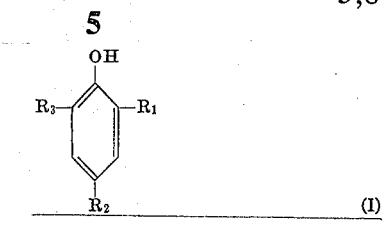

(I)

in which $R_1$, $R_2$ and $R_3$, which may be identical or different, each represent a hydrogen atom or a linear or branched alkyl radical containing 1 to 5 carbon atoms, or a formate ester of said phenol which comprises oxidising an aldehyde of the general formula:

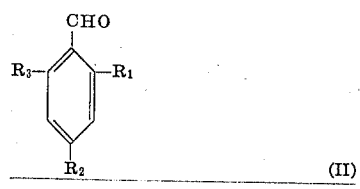

(II)

in which $R_1$, $R_2$ and $R_3$, are as defined above, with hydrogen peroxide, the aldehyde being in solution in a solvent selected from the group consisting of tetramethylene-sulphone and $C_1$–$C_4$ alkyl substituted tetramethylene-sulphones.

2. A process according to claim 1, wherein the reaction is carried out in the presence of, as catalyst, an inorganic or sulphonic acid having a dissociation constant in water greater than $10^{-3}$ in a quantity such that there is $1 \times 10^{-4}$ to $1 \times 10^{-1}$ equivalents of hydrogen ion per mole of hydrogen peroxide.

3. A process according to claim 2, wherein the reaction is carried out in the presence of sulphuric acid, perchloric acid, hydrochloric acid or p-toluene-sulphonic acid.

4. A process according to claim 1, wherein the amount of hydrogen peroxide is 0.2 to 1.5 mol per mole of aldehyde of formula (II).

5. A process according to claim 1, wherein the temperature is 0° to 150°C.

6. A process according to claim 1, wherein the aldehyde is benzaldehyde, o-tolualdehyde or p-tolualdehyde.

7. A process according to claim 1, wherein any unhydrolysed formate of the phenol of formula I present in the oxidation product is converted to the phenol of formula I by hydrolysis.

8. A process according to claim 1, wherein any unhydroylsed formate of the phenol of formula I present in the oxidation product is converted to the phenol of formula I by transesterification.

* * * * *